US006944101B2

(12) United States Patent  
Johns et al.

(10) Patent No.: US 6,944,101 B2
(45) Date of Patent: Sep. 13, 2005

(54) RECORDING POLE FOR DELIVERING COINCIDENT HEAT AND MAGNETIC FIELD

(75) Inventors: Earl C. Johns, Sewickley, PA (US); William A. Challener, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 141 days.

(21) Appl. No.: 10/601,409

(22) Filed: Jun. 23, 2003

(65) Prior Publication Data

US 2004/0008591 A1 Jan. 15, 2004

Related U.S. Application Data

(60) Provisional application No. 60/390,989, filed on Jun. 24, 2002.

(51) Int. Cl.[7] .............................................. G11B 11/00
(52) U.S. Cl. ................................ 369/13.13; 369/13.18; 369/13.24
(58) Field of Search ......................... 360/59, 125, 126; 369/13, 13.13, 13.18, 13.24

(56) References Cited

U.S. PATENT DOCUMENTS

| | | | | |
|---|---|---|---|---|
| 5,022,017 A | * | 6/1991 | Jansen et al. | 369/13.14 |
| 5,070,487 A | * | 12/1991 | Watson | 369/13.37 |
| 5,199,090 A | * | 3/1993 | Bell | 385/33 |
| 5,270,987 A | * | 12/1993 | Kaku et al. | 369/13.02 |
| 5,859,814 A | * | 1/1999 | Kino et al. | 369/13.33 |
| 5,986,978 A | | 11/1999 | Rottmayer et al. | |
| 6,016,290 A | | 1/2000 | Chen et al. | |
| 6,349,076 B1 | | 2/2002 | Chen | |
| 6,404,706 B1 | | 6/2002 | Stovall et al. | |
| 6,407,892 B2 | | 6/2002 | Shiroishi | |

OTHER PUBLICATIONS

Shi, Xiaolei; Thornton, Robert L.; and Hesselink, Lambertus. A Nano–aperture with 1000x Power Throughput Enhancement for Very Small Aperture Laser System (VSAL). Proceedings of SPIE. vol. 4342. Jan. 2002. pp. 320–327.*

Shi, Xiaolei and Hesselink, Lambertus. Mechanisms for Enhancing Power Throughput from Planar Nano–Apertures of Near–Field Optical Data Storage. Jpn. J. of Appl. Phys. vol. 41. Mar. 2002. pp. 1632–1635.*

Xiaolei Shi, Robert L. Thornton, Lambertus Hesselink, A Nano–aperture with 1000x Power Throughput Enhancement for Very Small Aperture Laser System (VSAL), 2002, Proceedings of SPIE, vol. 4342, pp. 320–327.

* cited by examiner

Primary Examiner—W. R. Young
Assistant Examiner—Adam R. Giesy
(74) Attorney, Agent, or Firm—Buchanan Ingersoll, P.C.

(57) ABSTRACT

A magnetic recording device is provided according to the present invention for magnetic recording on a recording medium. The magnetic recording device includes a magnetic pole and a C-aperture structure disposed adjacent the magnetic pole. A focusing element receives light from a light source and focuses the received light onto the C-aperture structure, such that the light incident upon the C-aperture structure and a magnetic flux flowing through the magnetic pole are co-locatable on a recording medium disposed adjacent to the magnetic recording device. The focusing element may include a planar waveguide receiving and focusing the light onto the C-aperture structure.

27 Claims, 5 Drawing Sheets

RECORDING POLE FOR DELIVERING COINCIDENT HEAT AND MAGNETIC FIELD

CROSS-REFERENCE TO RELATED APPLICATIONS

This application claims the benefit of co-pending provisional patent application Ser. No. 60/390,989 entitled "Method of Delivering Coincident Heat and High Magnetic Field", filed on Jun. 24, 2002, the entire disclosure of which is incorporated by reference herein.

STATEMENT REGARDING FEDERALLY SPONSORED RESEARCH

This invention was made with United States Government support under Agreement No. 70NANB1H3056 awarded by the National Institute of Standards and Technology (NIST).

The United States Government has certain rights in the invention.

FIELD OF THE INVENTION

The present invention is directed toward heat assisted magnetic recording in general and, more particularly, toward a recording pole delivering coincident heat and magnetic field for heat assisted magnetic recording.

BACKGROUND OF THE INVENTION

The ability to increase the data storage capacity in magnetic recording processes is an ongoing concern. As the amount of information to be stored continues to increase, the demand for higher density recording also continues to increase. Heat assisted magnetic recording (HAMR) is a proposed technology for increasing the storage density of conventional magnetic recording devices. Heat assisted magnetic recording combines facets of both optical and magnetic recording in an effort to increase storage capacity.

Conventional hard disc drives rely on a magnetic field produced by a small recording pole formed on a recording head. The recording head and recording pole are on a slider that "flies" across the surface of the disc as the disc spins. The magnetic field from the small recording pole needs to be sufficient to overcome the coercivity of the magnetic recording medium in the disc in order to define the recorded bits along the recording track in the recording medium.

As the storage density of disc drives increases, the size of the recorded bits in the recording medium must correspondingly decrease. Additionally, the individual magnetic grains which make up a recorded bit must also decrease in size to maintain approximately the same number of magnetic grains per bit cell in order to ensure a sufficient signal-to-noise ratio (SNR). However, as the size, and hence the volume, of the magnetic grains decrease, the thermal stability of the grains will also decrease unless the coercivity of the recording medium is increased. Thus, improved thermal stability is required in order to manufacture magnetic recording media for higher storage densities, such that, when the media is written upon, the recorded bits should not change magnetization direction simply by thermal fluctuations.

In order to provide for increased thermal stability, it is necessary to provide a recording medium having a high crystalline anisotropy (Ku). Such materials will also have a high coercivity and will be much more difficult to magnetize than conventional recording media. Heat assisted magnetic recording is one proposed technique for overcoming this difficulty. It is known that the coercive force of the recording media is lowered with elevated temperature. Therefore, if the temperature of the recording media is raised during writing, it will be possible to write information on the disc with a lesser strength magnetic field than if the recording media were not heated. When the recording media is subsequently cooled, the information on the media is thermally stable due to the high coercivity of the media. Heat assisted magnetic recording reduces the coercivity of the magnetic grains during recording by optically heating the spot to be recorded. However, in order to do this, the heat, i.e., light, and the magnetic field must be delivered coincident at the same location on the recording media.

The present invention is directed toward overcoming one or more of the above-mentioned problems.

SUMMARY OF THE INVENTION

A magnetic recording device is provided according to the present invention for magnetic recording on a recording medium. The magnetic recording device includes a magnetic pole and a C-aperture structure disposed adjacent to the magnetic pole. The C-aperture structure is positioned adjacent the magnetic pole such that light incident upon the C-aperture structure and a magnetic flux flowing through the magnetic pole are co-locatable on a recording medium disposed adjacent to the magnetic recording device.

The magnetic recording device may include a focusing element which receives light from a light source. The focusing element focuses the received light onto the surface of the C-aperture structure to maximize the light received on the surface of the C-aperture structure and, accordingly, provided to the recording medium.

The focusing element may include a planar waveguide receiving and focusing the light onto the C-aperture structure. The planar waveguide may include a core layer of material having a first optical index of refraction and planarized to the height of the C-aperture structure, and cladding layers disposed on opposite sides of the core layer and having a second optical index of refraction less that the first optical index of refraction. The top surface of the core layer may be convexly curved to act as a lens to focus the received light to the C-aperture structure.

In one form, the C-aperture structure includes a layer of dielectric material having a third optical index of refraction disposed on the magnetic pole, and a layer of conductive material disposed on the layer of dielectric material.

The layer of dielectric material may have an optical index of refraction ranging between 1.5 to 2.5. Such dielectric materials may include, but are not limited to, titanium oxide, tantalum oxide, aluminum oxide, silicon oxide, silicone nitride, zinc sulfide, and the like. The layer of conductive material may include conductors such as gold, silver, copper, aluminum, and the like.

In a further form, the magnetic pole includes front, back, leading edge and trailing edge surfaces. The layers of dielectric material and conductive material are provided at the front, back and trailing edge surfaces of the magnetic pole forming the C-aperture type structure, such that the light propagating through the C-aperture structure is collected in that portion of the layer of dielectric material adjacent to the trailing edge surface of the magnetic pole at an air bearing surface of the magnetic recording device.

In yet a further form, the C-aperture structure includes a transducer device disposed at the air bearing surface of the magnetic recording device for confining the light propagating through the C-aperture structure.

In still a further form, the magnetic pole includes a pole tip at the air bearing surface of the magnetic recording device. The C-aperture structure is provided at the pole tip of the magnetic pole.

It is an aspect of the present invention to efficiently deliver light, i.e., heat, to the same spot as the recording magnetic field.

It is a further aspect of the present invention to utilize a C-aperture structure to efficiently co-locate light and a recording magnetic field at the same spot on a recording medium.

It is still a further aspect of the present invention to co-locate optical and magnetic fields on a recording medium while minimizing the absorption and heating from the magnetic material.

Other aspects and advantages of the present invention can be obtained from the study of the specification, the drawings, and the appended claims.

DETAILED DESCRIPTION OF THE INVENTION

Figure 1:
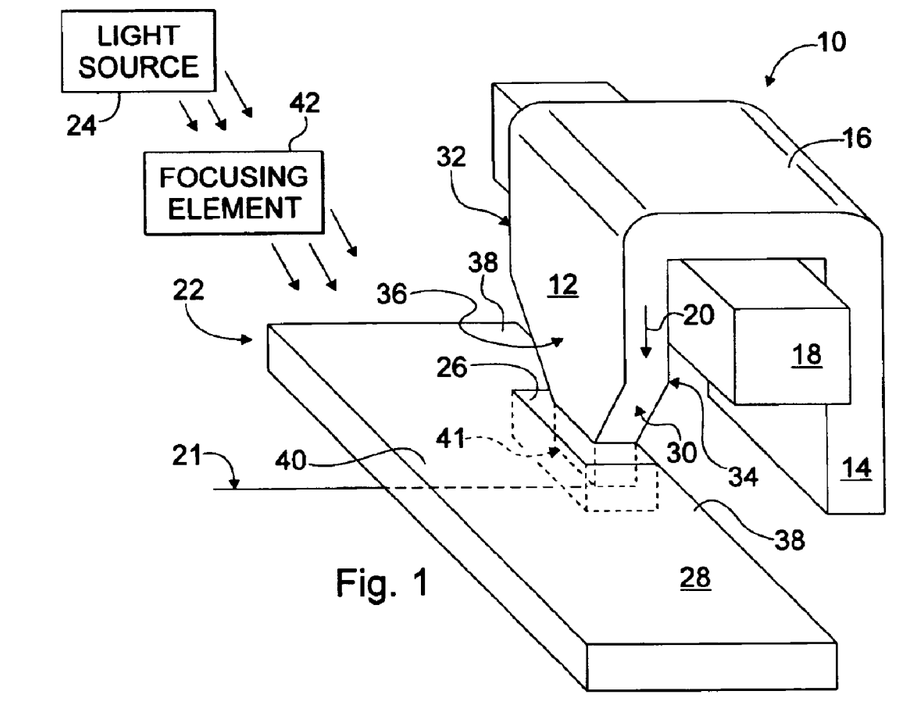
FIG. 1 is a perspective view of a magnetic recording head according to the present invention.
Figure 2:
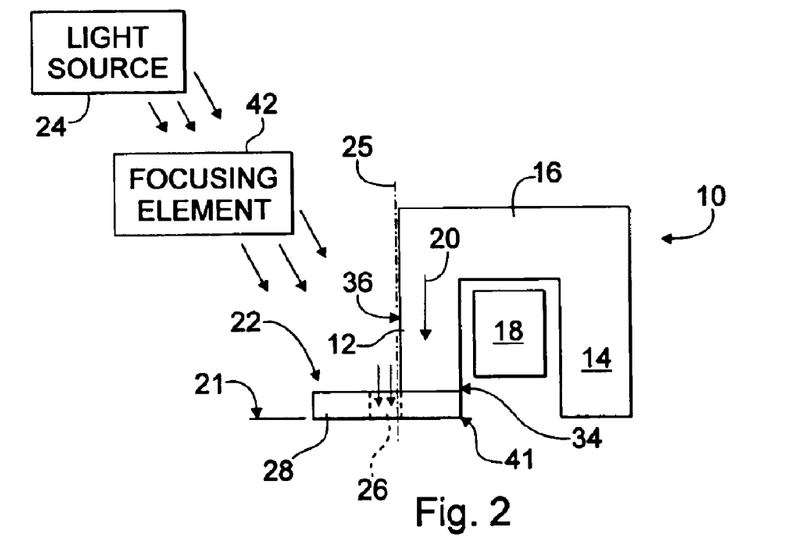
FIG. 2 is a front view of the magnetic recording head shown in FIG. 1.

FIGS. 1–2 illustrate a magnetic recording head, shown generally at 10, according to the present invention. The magnetic recording head 10 includes a main magnetic pole 12, a magnetic return pole 14, and a magnetic via 16 connecting the main 12 and return 14 magnetic poles. An electrically conductive magnetizing coil 18 is provided about the magnetic via 16 and is magnetically coupled to the main pole 12 to generate a write flux 20 through the main pole 12. One skilled in the art will recognize that the coil 18 may include a variable number of coil turns. Typically, the number of coil turns will be less than five, however, more coil turns may be utilized depending on the application of the magnetic recording head 10. The write flux 20 flows into a recording medium (not shown) disposed adjacent the magnetic recording head 10 at an air bearing surface 21 thereof to write information onto the recording medium. The return pole 14 and magnetic via 16 provide a return path for the flux 20.

The magnetic recording head 10 further includes a C-aperture structure, shown generally at 22, provided adjacent to the main magnetic pole 12. The C-aperture structure 22 receives light from a light source 24 and allows the received light to propagate along its propagation axis 25 (see FIG. 2). The C-aperture structure 22 includes a layer of dielectric material 26 deposited on the main magnetic pole 12. The dielectric layer 26 has a relatively high optical index of refraction, typically between 1.5 and 2.5. Some materials that are contemplated for the dielectric layer 26 include titanium oxide, tantalum oxide, aluminum oxide, silicon oxide, silicon nitride and zinc sulfide, however, other materials having appropriate optical properties and indices of refraction may be utilized without departing from the spirit and scope of the present invention.

The C-aperture structure 22 further includes a layer of conductive material 28 deposited on the dielectric layer 26. The conductive layer 28 may consist of any material having appropriate conductive properties. Examples of such materials that may be utilized for the conductive layer 28 include, but are not limited to, gold, silver, copper and aluminum.

As shown in FIGS. 1–2, the C-aperture structure 22 is provided about the main magnetic pole 12. The main magnetic pole 12 includes front 30, back 32, leading edge 34 and trailing edge 36 surfaces. The layers of dielectric material 26 and conductive material 28 are provided on the main magnetic pole 12 at its front 30, back 32 and trailing edge 36 surfaces to form the C-aperture type structure 22. While not specifically shown in FIGS. 1–2, the dielectric 26 and conductive 28 material layers may also be provided on the leading edge surface 34 of the main magnetic pole 12 without departing from the spirit and scope of the present invention.

The C-aperture structure 22 generally includes opposing arm members 38 connected together at an end by a waist member 40. The opposing arm members 38 are provided adjacent the front 30 and back 32 edges of the main magnetic pole 12, while the waist member 40 is provided adjacent the trailing edge 36 of the main magnetic pole 12. As a result of this configuration, the light propagating through the C-aperture structure 22 will be collected in that portion of the dielectric layer 26 adjacent to the trailing edge surface 36 of the main magnetic pole 12 at the air bearing surface 21 of the recording head 10, and incident upon the recording medium from a same side of the recording medium as the main magnetic pole 12.

The main magnetic pole 12 includes a pole tip portion 41 adjacent the air bearing surface 21 of the recording head 10. The C-aperture structure 22 is provided about at least two edges of the main magnetic pole 12 at the pole tip portion 41 thereof. However, the C-aperture structure 22 may be provided about the main magnetic pole 12 at other portions thereof without departing from the spirit and scope of the present invention.

As previously noted, the dielectric layer 26 has a relatively high optical index of refraction to allow the propagation of light therethrough. Typically, the main magnetic pole 12 may be made of magnetic materials having a sufficiently low optical index of refraction, such as ferrites, and the like, however, the main magnetic pole 12 may also be made of opaque magnetic materials, such as metals, CoFe, NiFe, CoNiFe, etc. Light incident upon the surface of the C-aperture structure 22 propagates through the dielectric layer 26 and becomes confined, as it propagates therethrough to the air bearing surface 21, to that portion of the dielectric layer 26 that is adjacent the trailing edge 36 of the main magnetic pole 12. To maximize the light that is incident upon the surface of the C-aperture structure 22, a focusing element 42 is provided, as shown in FIGS. 1–2. The focusing element 42 may be an optical lens, or other focusing structure, and receives light from the light source 24 and focuses the received light onto the surface of the C-aperture structure 22. The focusing element 42 may be attached to the main magnetic pole 12 or to other elements (not shown) that form a part of the magnetic recording head 10.

Figure 3:
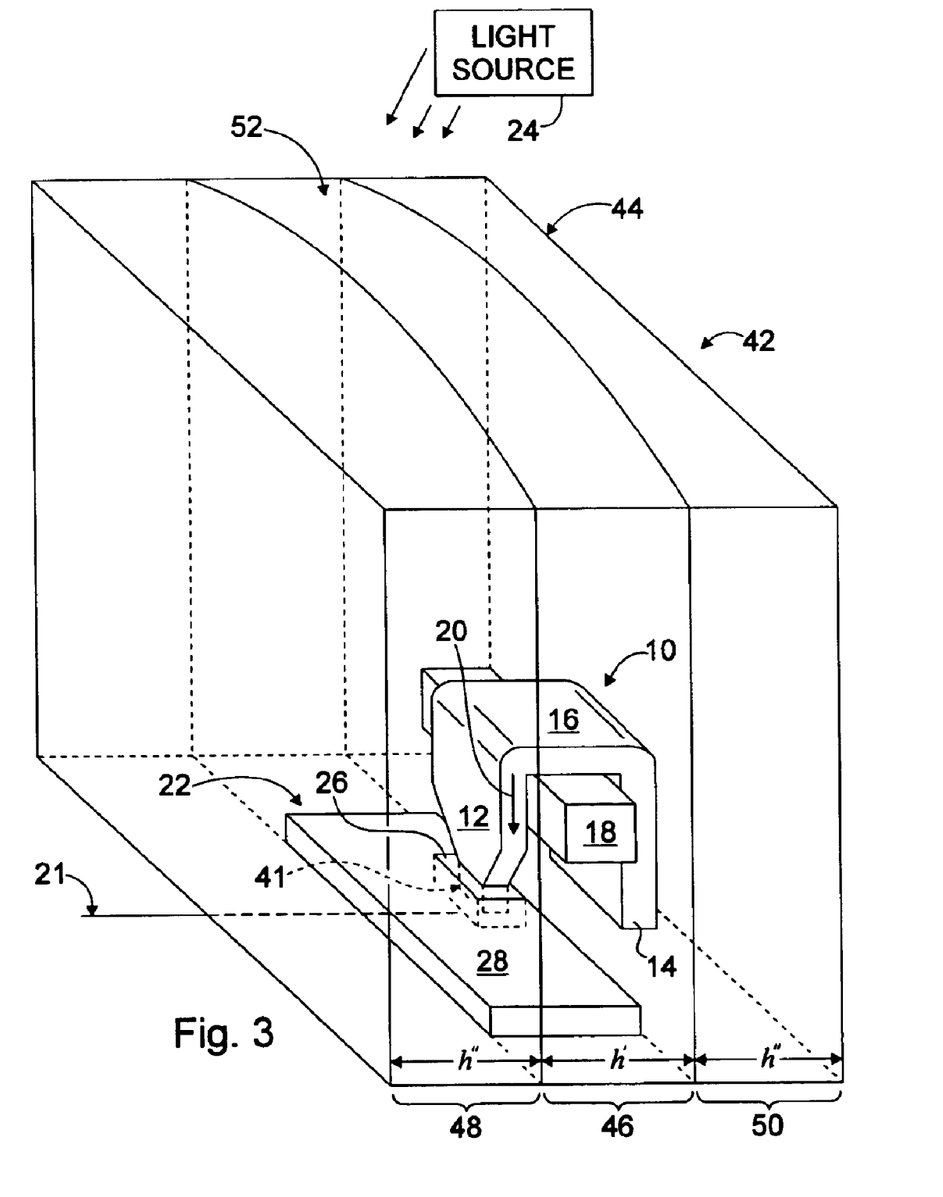
FIG. 3 is a perspective view of a magnetic recording head according to an alternate embodiment of the present invention.

As shown in FIG. 3, the focusing element 42 may include a planar waveguide, shown generally at 44, for confining the light received from the light source 24 to the C-aperture structure 22. The planar waveguide 44 includes a core layer 46 of material having a high optical index of refraction and planarized to the height of the conductive layer 28 during manufacturing of the magnetic recording head 10. The planar waveguide 44 further includes cladding layers 48, 50 of material having a relatively low optical index of refraction. For exemplary purposes only, the core layer 46 may have an optical index of refraction of approximately 2.4, and may include materials such as tantalum oxide, titanium oxide, and the like. Additionally, and for exemplary purposes only, the cladding layers 48 and 50 may have an optical index of refraction of approximately 1.6, and may include materials such as silicon oxide, aluminum oxide, and the like.

By surrounding the core layer 46, which has a high optical index of refraction, with cladding layers 48 and 50, which have a low optical index of refraction, the planar waveguide 44 will confine the light from the light source 24 to the core layer 46 and allow the light to propagate along the planar waveguide's 44 propagation axis and focus the propagated light in the general area of the C-aperture structure 22. As shown in FIG. 3, the top surface 52 of the core layer 46 includes a convex curvature in order to assist in focusing the light propagating through the planar waveguide 44 to the C-aperture structure 22. The top, convexly curved surface 52 acts as a lens to focus the light to the C-aperture structure 22.

Figure 4:
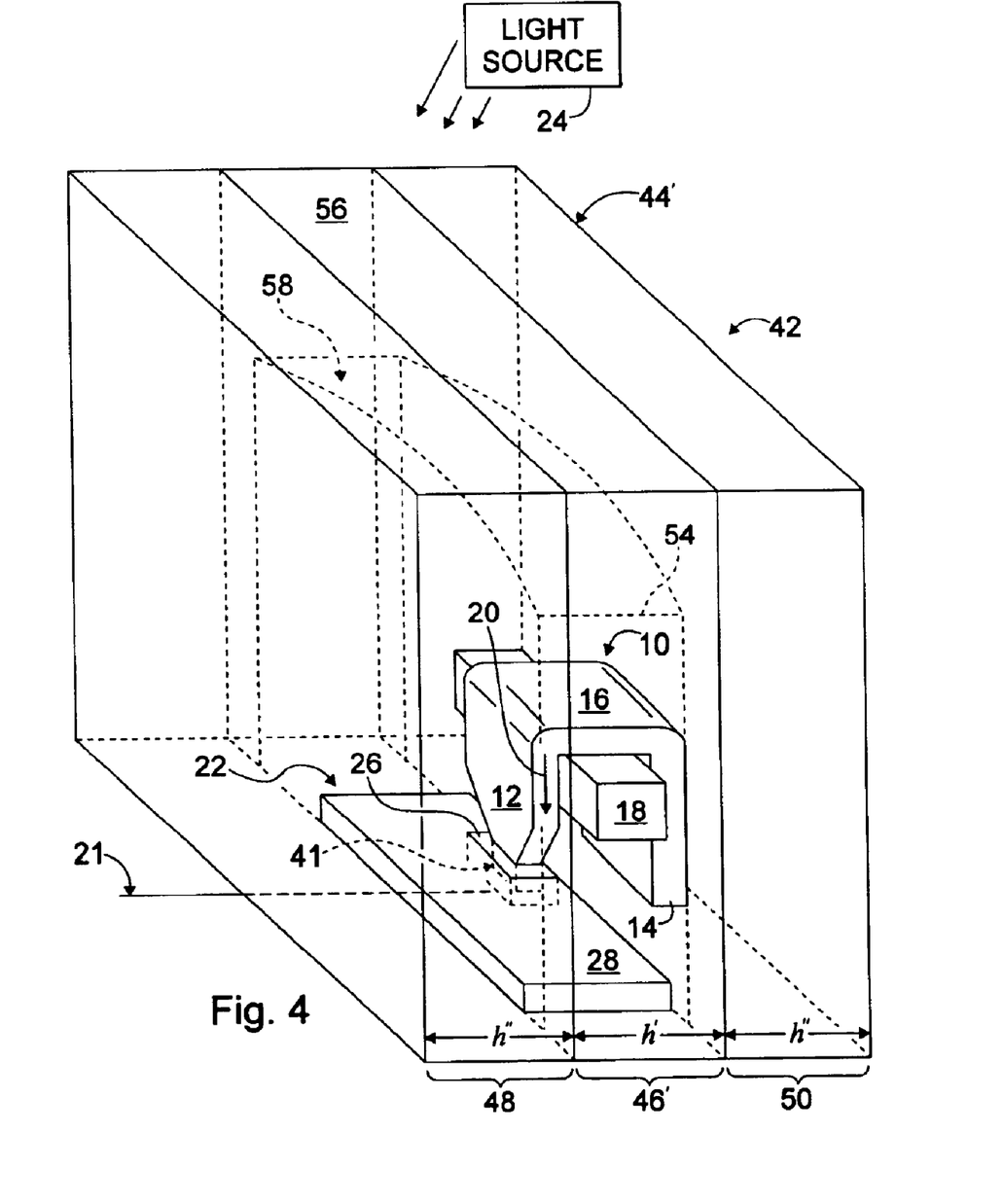
FIG. 4 is a perspective view of a magnetic recording head according to a further embodiment of the present invention.
Figure 5:
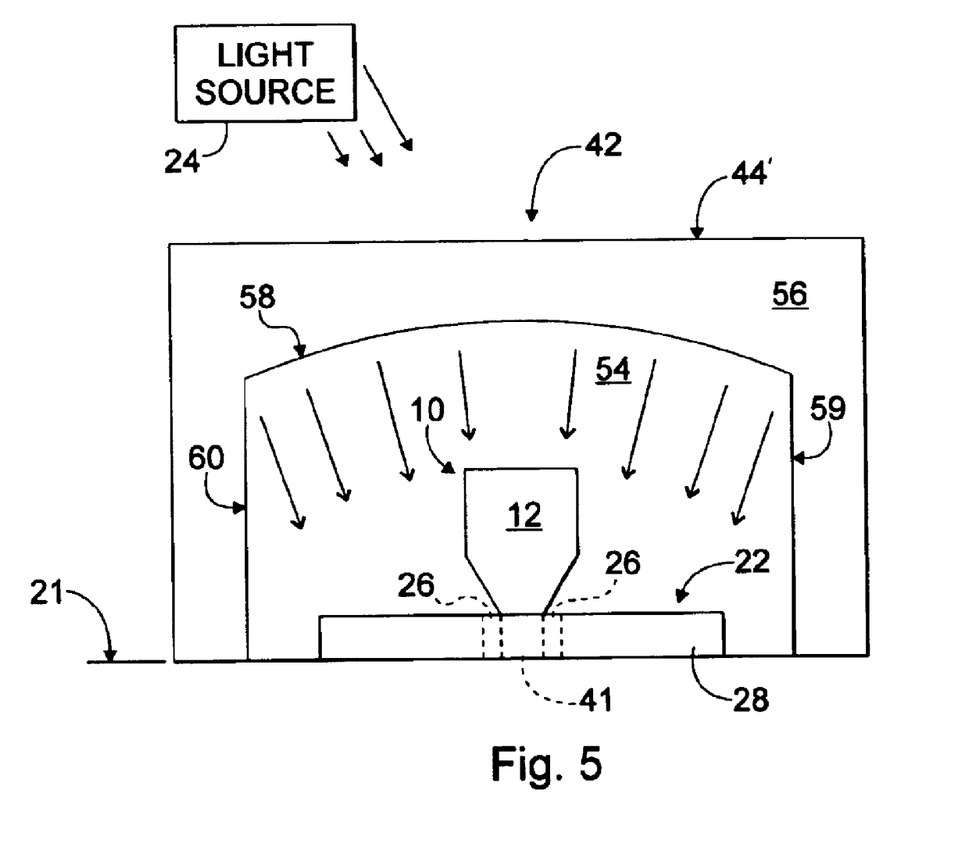
FIG. 5 is a left side view of the magnetic recording head shown in FIG. 4, with the cladding layer removed.

FIGS. 4–5 illustrate an alternate embodiment of the planar waveguide, show generally at 44', with like elements of FIG. 3 indicated with the same reference number and those elements requiring modification indicated with a prime ('). As shown in FIGS. 4–5, the core layer 46' includes a layer of high index material 54 having a relatively high optical index of refraction, and a layer of low index material 56 provided about the layer of high index material 54. The low index material layer 56 is typically provided about the top, front and back surfaces of the high index layer 54, as shown in FIGS. 4–5. For exemplary purposes only, the high index layer 54 may include an optical index of refraction of approximately 2.4, and may include materials such as tantalum oxide, titanium oxide, and the like. Additionally, and for exemplary purposes only, the low index material layer 56 may include an optical index of refraction of approximately 2.0–2.2, and may include materials such as silicon nitride, silicon monoxide, zinc sulfide, tantalum oxide, and the like.

By surrounding the core layer 46', which includes material layers 54 and 56 having a relatively high optical index of refraction, with cladding layers 48 and 50 having a relatively low optical index of refraction, the planar waveguide 44' will confine the light from the light source 24 to the core layer 46' and allow the light to propagate along the planar waveguide's 44' propagation axis to the surface of the C-aperture structure 22. As shown in FIGS. 4–5, the top surface 58 of the high index layer 54 includes a convex curvature to assist in focusing the light propagating through the planar waveguide 44' to the C-aperture structure 22. The top, convexly curved surface 58 acts as a lens to focus the light to the C-aperture structure 22. FIG. 5 best illustrates the focusing of the light achieved by the convex top surface 58. While the front 59 and back 60 surfaces of the high index layer 54 are illustrated in FIG. 5 as extending substantially vertical, the front 59 and back 60 surfaces may be angled toward or away from the C-aperture structure 22 without departing from the spirit and scope of the present invention.

Thus, by either using a focusing element 42 in general, or the planar waveguides 44 and 44' shown in FIGS. 3–5, the light received from the light source 24 is focused to the surface of the C-aperture structure 22. This maximizes the amount of light received by the C-aperture structure 22 and, accordingly, increases the amount of light that maybe focused onto the recording medium (not shown) to assist in the recording process.

Figure 6:
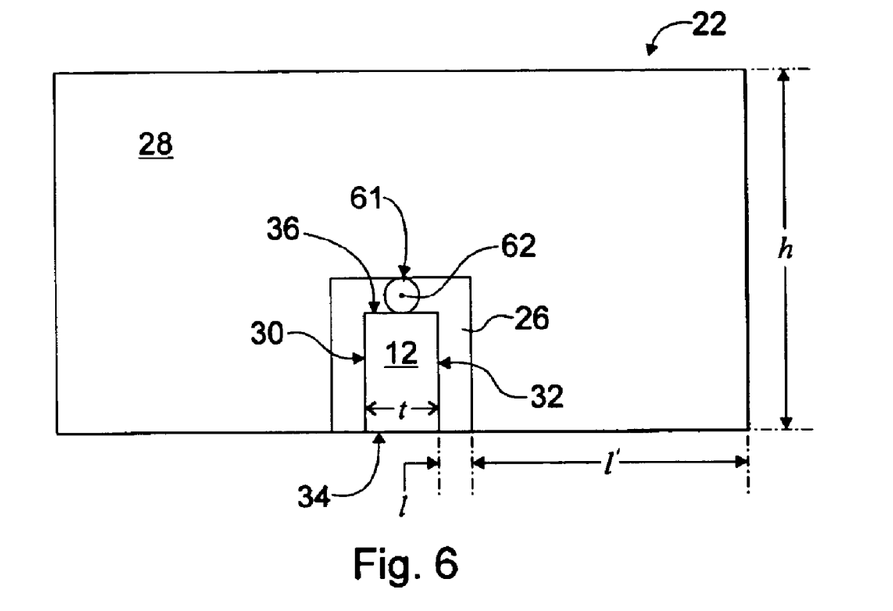
FIG. 6 is an air bearing surface view of the main magnetic pole of the inventive magnetic recording head.

To assist in focusing the light propagating through the C-aperture structure 22 to an optical spot on a recording medium (not shown), the C-aperture structure 22 may further include a transducer device disposed at the air bearing surface 21 (see FIG. 6). As shown in FIG. 6, the transducer device 61 is provided in that portion of the dielectric layer 26 that is adjacent the trailing edge 36 of the main magnetic pole 12, since this is where the majority of the light will be concentrated when it reaches the air bearing surface 21. The transducer device 61 confines and focuses the light propagating through the C-aperture structure 22, and enables the optical spot and magnetic flux to be co-located on a recording medium (not shown) positioned adjacent to the air bearing surface 21 of the magnetic recording head 10. The transducer device 61 may include a metal material, such as aluminum, and the like, deposited on an end of the dielectric layer 26 at the air bearing surface 21, with an aperture 62 formed in the metal material. Additionally, a solid immersion lens (SIL) device (not shown) could replace the transducer device 61 to properly focus the light propagating through the C-aperture structure 22. The SIL device may be formed in the C-aperture structure 22 by doping a portion of the dielectric layer 26 near the air bearing surface 21 to confine and focus the light to an optical spot. One skilled in the art will appreciate that other methods and/or structures of confining and focusing light propagating through the C-aperture 22 structure may be utilized without departing from the spirit and scope of the present invention.

Figure 7:
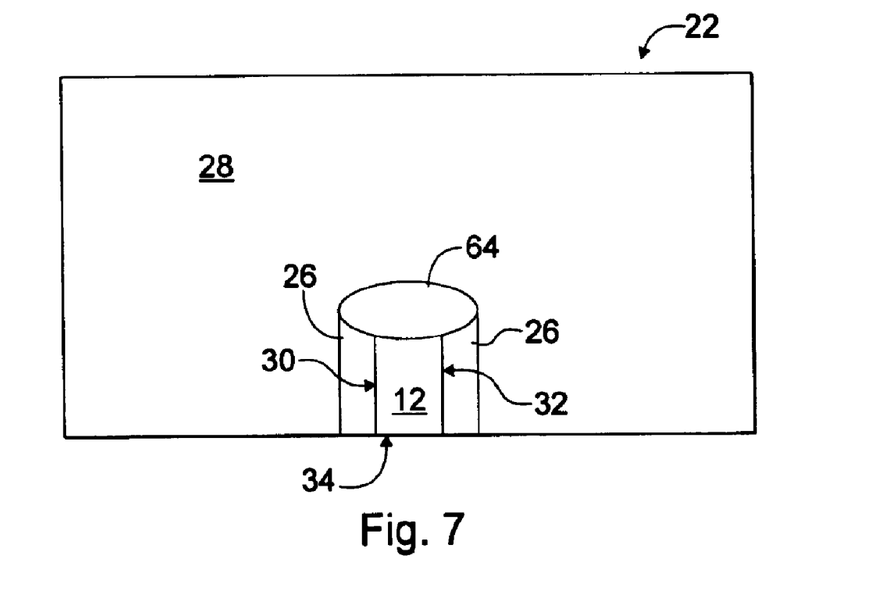
FIG. 7 is an air bearing surface view of the main magnetic pole of the inventive magnetic recording head illustrating the optical "hot spot".

As shown in FIG. 7, the light propagating through the C-aperture structure 22 will be confined to the dielectric layer 26 and focused in that portion of the dielectric layer 26 adjacent the trailing edge 36 of the main magnetic pole 12. FIG. 7 illustrates the "hot spot", shown at 64, formed by the light propagating through the C-aperture structure 22. As shown in FIG. 7, the hot spot 64 is formed at the air bearing surface 21 at that portion of the dielectric layer 26 adjacent the trailing edge 36 of the main magnetic pole 12.

By co-locating the optical spot with the magnetic flux on a magnetic recording medium, the light will reduce the coercivity of the recording medium only during recording, which in turn will help achieve higher storage densities on the recording medium. When the recording medium is subsequently cooled, the information on the medium is thermally stable due to the high coercivity of the recording medium. Typically, the thicknesses and the dimensions of the layers of dielectric material 26 and conductive material 28 will be governed by the intended application of the magnetic recording device 10, and such thicknesses and dimensions are readily ascertainable by one of ordinary skill in the art.

By way of example only, and referring to FIG. 6, typically the main magnetic pole 12 includes a thickness t of approximately 2–20 microns. It is contemplated herein that the dielectric layer 26 of the C-aperture device 22 will have a length l of approximately $0.5\lambda$, where $\lambda$ is the wavelength of the light propagating through the C-aperture structure 22. The conductive layer 28 may have a length l' of approximate $5\lambda$. While the height of the dielectric layer 26 will depend on the size of the main magnetic pole 12, it is contemplated herein that the height h of the C-aperture structure 22 will be approximately $5–20\lambda$. Similarly, the height h' of the core layer 46, 46' and the height h" of the cladding layers 48, 50, will also be approximately 5–20λ (see FIGS. 3–4). While the thickness of the C-aperture structure 22 will depend on the height of the pole tip 41 of the main magnetic pole 12, a proposed thickness of the C-aperture structure 22 is approximately 50–100 nanometers. As previously noted, other lengths, heights and thicknesses may be utilized without departing from the spirit and scope of the present invention.

While the present invention has been described with particular reference to the drawings, it should be understood that various modifications could be made without departing from the spirit and scope of the present invention.

We claim:

1. A device comprising:
   a main magnetic pole; and
   a C-aperture structure disposed adjacent at least two edges of the main magnetic pole, wherein light incident upon the C-aperture structure and a magnetic flux flowing through the main magnetic pole are co-locatable on a recording medium disposed adjacent the device,
   wherein the light is incident upon the recording medium from a same side of the recording medium as the main magnetic pole.

2. The device of claim 1, wherein the C-aperture structure comprises:
   a layer of dielectric material disposed adjacent the main magnetic pole, the layer of dielectric material having a first index of refraction; and
   a layer of conductive material disposed adjacent the layer of dielectric material.

3. The device of claim 2, wherein the layer of dielectric material is selected from the group consisting of titamum oxide, tantalum oxide, aluminum oxide, silicon oxide, silicon nitride and zinc sulfide.

4. The device of claim 2, wherein the layer of conductive material is selected from the group consisting of gold, silver, copper and aluminum.

5. The device of claim 2, wherein the main magnetic pole includes front, back, leading edge and trailing edge surfaces, and wherein the layers of dielectric material and conductive material are provided at the front, back and trailing edge surfaces of the main magnetic pole.

6. The device of claim 1, wherein the main magnetic pole includes front, back, leading edge and trailing edge surfaces, and wherein the C-aperture structure is provided about the front, back and trailing edge surfaces of the main magnetic pole.

7. The device of claim 1, wherein the main magnetic pole includes a pole tip at an air bearing surface of the device, and wherein the C-aperture structure is provided at the pole tip of the main magnetic pole.

8. The device of claim 1, wherein the C-aperture structure includes a transducer device deposed at an air bearing surface of the device, the transducer device confining the light propagating through the C-aperture structure.

9. The device of claim 1, further comprising a focusing element receiving light from a light source and focusing the received light onto the C-aperture structure.

10. The device of claim 9, wherein the focusing element comprises a planar waveguide.

11. The device of claim 10, wherein the planar waveguide comprises:
    a layer of core material having a second index of refraction, the core layer planarized to a height of the C-aperture structure; and
    cladding layers disposed on opposite sides of the core layer, wherein the cladding layers have a third index of refraction less than the second index of refraction.

12. The device of claim 11, wherein the core layer includes a convexly curved top surface focusing the received light onto the C-aperture structure.

13. The device of claim 12, wherein the planar waveguide further comprises a lower index core material provided about the core layer at the top, front and back surfaces thereof, the lower index core material including a fourth index of refraction less than the second index of refraction and greater than the third index of refraction.

14. A magnetic recording device for magnetic recording on a recording medium comprising:
    a magnetic pole; and
    a C-aperture structure provided about at least two edges of the magnetic pole, wherein light incident upon the C-aperture structure and a magnetic flux flowing through the magnetic pole are co-located on a recording medium disposed adjacent the magnetic recording device,
    wherein the light is incident upon the recording medium from a same side of the recording medium as the magnetic pole.

15. The magnetic recording device of claim 14, wherein the magnetic pole includes front, back, leading edge and trailing edge surfaces, and wherein the C-aperture structure is provided about the magnetic pole at the front, back and trailing edge surfaces thereof.

16. The magnetic recording device of claim 15, wherein the C-aperture structure includes opposing arm members connected at an end by a waist member, and wherein the C-aperture structure is provided about the magnetic pole such that the opposing arm members are positioned adjacent the front and back edges of the magnetic pole and the waist member is positioned adjacent the trailing edge of the magnetic pole.

17. The magnetic recording device of claim 14, wherein the C-aperture structure comprises:
    a layer of dielectric material provided on the magnetic pole, the layer of dielectric material having a first index of refraction; and
    a layer of conductive material provided on the layer of dielectric material.

18. The magnetic recording device of claim 17, wherein the layer of dielectric material is selected from the group consisting of titanium oxide, tantalum oxide, aluminum oxide, silicon oxide, silicon nitride and zinc sulfide.

19. The magnetic recording device of claim 17, wherein the layer of conductive material is selected from the group consisting of gold, silver, copper and aluminum.

20. The magnetic recording device of claim 17, wherein the magnetic pole includes front, back, leading edge and trailing edge surfaces, and wherein the layers of dielectric material and conductive material are provided at the front, back and trailing edge surfaces of the magnetic pole.

21. The magnetic recording device of claim 14, wherein the magnetic pole includes a pole tip at an air bearing surface of the magnetic recording device, and wherein the C-aperture structure is provided about the magnetic pole at the pole tip.

22. The magnetic recording device of claim 14, wherein the C-aperture structure includes a transducer device disposed at an air bearing surface of the magnetic recording device, the transducer device confining the light propagating through the C-aperture structure.

23. The magnetic recording device of claim 14, further comprising a focusing element receiving light from a light source and focusing the received light onto the C-aperture structure.

24. The magnetic recording device of claim 23, wherein the focusing element comprises a planar waveguide.

25. The magnetic recording device of claim 24, wherein the planar waveguide comprises:
- a layer of core material having a second index of refraction, the core layer planarized to a height of the C-aperture structure; and
- cladding layers disposed on opposite sides of the core layer, wherein the cladding layers have a third index of refraction less than the second index of refraction.

26. The magnetic recording device of claim 25, wherein the core layer includes a convexly curved top surface focusing the received light onto the C-aperture structure.

27. The magnetic recording device of claim 26, wherein the planar waveguide further comprises a lower index core material provided about top core layer at the top front and back surfaces thereof, the lower index core material including a fourth index of refraction less than the second index of refraction and greater than the third index of refraction.

* * * * *